(12) United States Patent
Dias et al.

(10) Patent No.: US 8,108,855 B2
(45) Date of Patent: Jan. 31, 2012

(54) METHOD AND APPARATUS FOR DEPLOYING A SET OF VIRTUAL SOFTWARE RESOURCE TEMPLATES TO A SET OF NODES

(75) Inventors: Daniel Manuel Dias, Mohegan Lake, NY (US); Arun Kwangil Iyengar, Yorktown Heights, NY (US); Isabelle Marie Rouvellou, New York, NY (US); Hidayatullah Habeebullah Shaikh, Shrub Oak, NY (US); Jian Yin, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 1174 days.

(21) Appl. No.: 11/854,185

(22) Filed: Sep. 12, 2007

(65) Prior Publication Data

US 2008/0163194 A1    Jul. 3, 2008

Related U.S. Application Data

(63) Continuation-in-part of application No. 11/618,946, filed on Jan. 2, 2007.

(51) Int. Cl.
*G06F 9/445* (2006.01)
*G06F 9/45* (2006.01)

(52) U.S. Cl. ............... 717/177; 717/176; 709/203

(58) Field of Classification Search .......... 717/149–150, 717/168–177; 709/203–204
See application file for complete search history.

(56) References Cited

U.S. PATENT DOCUMENTS

| 4,674,038 | A |   | 6/1987  | Brelsford et al.        |
|-----------|---|---|---------|-------------------------|
| 5,682,535 | A | * | 10/1997 | Knudsen ......... 717/117 |
| 5,807,790 | A |   | 9/1998  | Gupta et al.            |
| 6,094,528 | A |   | 7/2000  | Jordan                  |
| 6,510,448 | B1|   | 1/2003  | Churchyard              |
| 6,633,916 | B2|   | 10/2003 | Kauffman                |
| 6,734,873 | B1|   | 5/2004  | Herf et al.             |
| 6,775,699 | B1|   | 8/2004  | DeLuca et al.           |

(Continued)

FOREIGN PATENT DOCUMENTS

JP    2004005650    1/2004
(Continued)

OTHER PUBLICATIONS

Crameri et al, "Staged deployment in mirage and integrated software upgrade testing and distribution system", ACM SOSP, pp. 221-236, 2007.*

(Continued)

*Primary Examiner* — Anil Khatri
(74) *Attorney, Agent, or Firm* — Yee & Associates, P.C.; Derek S. Jennings

(57) ABSTRACT

Deploying a set of virtual software resource templates to a plurality of nodes is provided. The process identifies a set of virtual machine images and metadata to form a set of virtual software resource templates. The process creates a model that indicates a performance metric based on a number of nodes on which a number of virtual machine images is deployed. The process receives a quality of service requirement. The process determines, using the model, a sufficient number of virtual software resource templates in the set of virtual software resource templates and a sufficient number of nodes in the plurality of nodes to fulfill the quality of service requirement. The process deploys the sufficient number of virtual software resource templates on the sufficient number of nodes using the metadata.

17 Claims, 4 Drawing Sheets

U.S. PATENT DOCUMENTS

| | | | |
|---|---|---|---|
| 6,802,062 B1 | 10/2004 | Oyamada et al. | |
| 6,848,106 B1 | 1/2005 | Hipp | |
| 6,917,963 B1 | 7/2005 | Hipp et al. | |
| 6,941,410 B1 | 9/2005 | Traversat et al. | |
| 7,013,462 B2* | 3/2006 | Zara et al. | 717/177 |
| 7,093,247 B2* | 8/2006 | Ashworth et al. | 717/174 |
| 7,127,713 B2* | 10/2006 | Davis et al. | 717/177 |
| 7,131,122 B1* | 10/2006 | Lakhdhir | 717/168 |
| 7,150,015 B2* | 12/2006 | Pace et al. | 717/176 |
| 7,206,827 B2 | 4/2007 | Viswanath et al. | |
| 7,313,793 B2 | 12/2007 | Traut et al. | |
| 7,356,679 B1 | 4/2008 | Le et al. | |
| 7,506,336 B1* | 3/2009 | Ninan | 717/175 |
| 7,506,338 B2* | 3/2009 | Alpern et al. | 717/177 |
| 7,587,453 B2* | 9/2009 | Bhrara et al. | 709/204 |
| 7,676,803 B2* | 3/2010 | Zhao et al. | 717/168 |
| 7,730,183 B2* | 6/2010 | Brown et al. | 709/226 |
| 7,730,480 B2* | 6/2010 | Isaacson | 717/174 |
| 7,743,363 B2 | 6/2010 | Brumme et al. | |
| 7,761,865 B2* | 7/2010 | Stienhans et al. | 717/170 |
| 7,865,888 B1* | 1/2011 | Qureshi et al. | 717/168 |
| 7,870,153 B2* | 1/2011 | Croft et al. | 707/781 |
| 7,908,313 B2* | 3/2011 | Lurie et al. | 709/203 |
| 7,949,677 B2* | 5/2011 | Croft et al. | 707/781 |
| 2004/0060048 A1 | 3/2004 | Abelite et al. | |
| 2005/0041588 A1 | 2/2005 | Kim et al. | |
| 2005/0050175 A1 | 3/2005 | Fong et al. | |
| 2006/0184937 A1 | 8/2006 | Abels et al. | |
| 2006/0277542 A1 | 12/2006 | Wipfel | |
| 2007/0006205 A1 | 1/2007 | Kennedy et al. | |
| 2007/0089111 A1 | 4/2007 | Robinson et al. | |
| 2007/0157172 A1 | 7/2007 | Zenz et al. | |
| 2007/0157185 A1 | 7/2007 | Semerdzhiev et al. | |
| 2007/0162892 A1 | 7/2007 | Zenz et al. | |
| 2007/0234334 A1 | 10/2007 | Araujo et al. | |
| 2007/0234337 A1 | 10/2007 | Suzuki et al. | |
| 2007/0234356 A1 | 10/2007 | Martins et al. | |
| 2007/0283314 A1 | 12/2007 | Browning et al. | |
| 2007/0294676 A1 | 12/2007 | Mellor et al. | |
| 2007/0300220 A1 | 12/2007 | Seliger et al. | |
| 2007/0300221 A1 | 12/2007 | Hartz et al. | |
| 2008/0034071 A1 | 2/2008 | Wilkinson et al. | |
| 2008/0127169 A1 | 5/2008 | Malasky et al. | |
| 2008/0155537 A1 | 6/2008 | Dinda et al. | |
| 2008/0184225 A1 | 7/2008 | Fitzgerald et al. | |
| 2008/0222234 A1 | 9/2008 | Marchand | |
| 2009/0089860 A1 | 4/2009 | Forrester et al. | |
| 2009/0113395 A1 | 4/2009 | Creamer et al. | |
| 2009/0276771 A1 | 11/2009 | Nickolov et al. | |
| 2010/0083218 A1 | 4/2010 | Bender | |
| 2011/0119670 A1 | 5/2011 | Sugumar et al. | |
| 2011/0119748 A1 | 5/2011 | Edwards et al. | |

FOREIGN PATENT DOCUMENTS

| | | |
|---|---|---|
| JP | 2005174201 | 6/2005 |
| JP | 2005292956 | 10/2005 |
| WO | WO03021516 | 3/2003 |

OTHER PUBLICATIONS

Wolinsky et al, "On the design of virtual machine sandboxes for distributed computing in wide area overlays of virtual workstations", IEEE VTDC, pp. 1-8, 2006.*

Villa et al, "Scalable transparent checkpoint restart of global address space applications on virtual machines over infiniband", ACM CF, pp. 197-206, 2009.*

Nicolae et al, "Going back and forth: Efficient multideployment and multisnapshotting on clouds", ACM HPDC, pp. 147-158, 2011.*

Figueiredo et al., "A Case for Grid Computing on Virtual Machines", Proceedings of the 23rd International Conference on Distributed Computing Systems, pp. 1-10, May 22, 2003, URL:http://ieeexplore.ieee.org/xpls/abs_all.jsp?arnumber=1203506>.

Sundararaj et al., "Towards Virtual Networks for Virtual Machine Grid Computing", Online, pp. 1-14, May 7, 2004, URL:http://portal.acm.org/citation.cfm?id=1267242.1267256>.

"Virtual Machine Emulation Facility for Performance Evaluation", IBM Technical Disclosure Bulletin, Dec. 1978, pp. 3004-3005.

U.S. Appl. No. 11/618,946, filed Jan. 2, 2007, Chess et al.

Krsul et al., "VMPlants: Providing and Managing Virtual Machine Execution Environments for Grid Computing", ACM Digital Library, 2004 IEEE, pp. 1-12.

Snyder et al., "Visibility Sorting and Compositing without Splitting for Image Layer Decompositions", ACM Digital Library, Proceedings of the 25th annual conference on Computer graphics and interactive techniques, 1998, pp. 219-230.

Kherfi et al., "Image Retrieval from the World Wide Web: Issues, Techniques, and Systems", ACM Computing Surveys, vol. 36, No. 1, Mar. 2004, pp. 35-67.

International Search Report and Written Opinion issued on Mar. 3, 2008 for PCT/EP2007/064117.

Office Action issued on Aug. 3, 2011 for U.S. Appl. No. 11/618,946.

* cited by examiner

TABLE 302

| MAJOR COMPONENTS | REQUIRED MIDDLEWARE COMPONENTS |
|---|---|
| DATA SERVER | DB2 UDB ESE V8.2<br>ITDS V5.2<br>BPEDP<br>LDAP DB<br>PORTAL DB |
| UI SERVER | WEBSPHERE PORTAL V5.1<br>ITDS CLIENT V5.2 |
| PROCESS SERVER | WBI-SF V5.1<br>ITDS CLIENT V5.2 |
| APPLICATION SERVER | WAS ND V5.1<br>ITDS CLIENT V5.2<br>DB2 ALPHABLOX V8.2 |
| CLI CLIENT | WAS APPLICATION CLIENT V5.1 |

*FIG. 3A*

TABLE 320

| TOPOLOGIES | TOPOLOGY NODES/VM IMAGES | MAJOR COMPONENTS FOR EACH NODE |
|---|---|---|
| SINGLE SERVER + CLIENT | A<br>B | CLI CLIENT (A)<br>DATA SERVER (B)<br>UI (B)<br>PROCESS SERVER (B)<br>APPLICATION SERVER (B) |
| TWO SERVERS + CLIENT | A<br>C<br>D | CLI CLIENT (A)<br>DATA SERVER (C)<br>UI (D)<br>PROCESS SERVER (D)<br>APPLICATION SERVER (D) |
| FOUR SERVERS + CLIENT | A<br>C<br>E<br>F<br>G | CLI CLIENT (A)<br>DATA SERVER (C)<br>UI (F)<br>PROCESS SERVER (G)<br>APPLICATION SERVER (H) |

*FIG. 3B*

METHOD AND APPARATUS FOR DEPLOYING A SET OF VIRTUAL SOFTWARE RESOURCE TEMPLATES TO A SET OF NODES

CROSS-REFERENCE TO RELATED APPLICATION

This application is a continuation-in-part of patent application U.S. Ser. No. 11/618,946, filed Jan. 2, 2007, titled "Virtual Resource Templates", which is incorporated herein by reference.

BACKGROUND OF THE INVENTION

1. Field of the Invention

The present invention relates generally to a data processing system and in particular to a method and system for deploying a set of virtual software resource templates. More particularly, the present invention is directed to a computer-implemented method, apparatus, and computer-usable program code for deploying a set of virtual software resource templates to a set of nodes.

2. Description of the Related Art

Increasingly, modern computing environments are distributing software solutions as a set of virtual machine (VM) images as opposed to the various single software components that make up the solutions. A virtual machine image is a file representation of a virtual machine, the virtual machine devices, and installed software components. Virtualizers, like VMware® Server, instantiate and run virtual machines starting from their file-based representation or image. VMware Server® is a product of VMware Inc. Distributing software solutions as virtual machine images is very appealing for both software vendors and customers because of the simplified and less-error prone deployment and maintenance process.

For example, IT Service Management, which is used to manage large-scale information technology systems, is a distribution software solution that comprises different components and supported topologies. Topologies represent a particular mapping between one or more software components of a solution and one or more machines or topology nodes where these components are installed. Usually, a solution may be deployed in one or more topologies.

With this type of solution, IT Service Management may distribute a lesser number of pre-configured virtual machine images as compared to distributing different major components and middleware components. The major components and middleware components depend on the application to which the virtual machine images are applied. For example, in an application related to database management, DB2 and WebSphere Application Server may constitute part of a set of deployed virtual machine images. DB2 is a relational database management system and WebSphere Application Server is middleware. Both DB2 and WebSphere Application Server are products of International Business Machines Corporation, located in Armonk, N.Y.

The pre-configured virtual machine images may include one or more software stacks. A software stack is a set of software components, such as an operating system, middleware, or application components, needed to deliver a fully functional software solution for a particular application.

In the case of deploying the separate software components, the deployment process consists of installing and configuring all the components of the different software stack and then configuring their inter-connections. In the case of deploying virtual machines (VMs), the deployment process consists of deploying the virtual machines associated with a certain topology and configuring the external connections in each virtual machine so that each virtual machine communicates correctly with the other virtual machines in the topology. Also, the virtual machines are configured to communicate with any necessary services in the existing computing infrastructure into which the virtual machines are being configured.

However, current virtual machine technology is aimed at the process of creating, duplicating, and deploying virtual machines themselves without reference to the application(s) installed in the virtual machine images or to the dependencies among multiple virtual machines that fulfill various parts of a distributed application.

In addition, configuring a large-scale software service can be a difficult and time-consuming task. To achieve optimal performance, such as high throughput, a software service often needs to leverage hardware resources on a set of nodes in a cluster. A node is a computing device that contains resources, such as processing speed, memory capacity, and hard disk space. A node may be either a physical computing device or a virtual computing device. Also, manually configuring nodes to meet one or more service requirements can be a time-consuming task that is vulnerable to user error.

SUMMARY

The illustrative embodiments described herein provide a computer-implemented method, apparatus, and computer program product for deploying a set of virtual software resource templates to a plurality of physical computing device nodes. A set of virtual machine images and associated metadata of each virtual machine image in the set of virtual machine images is identified. A set of virtual software resource templates is generated using the set of virtual machine images and associated metadata. The set of virtual software resource templates is stored in a repository. A model is created that includes a performance level metric based on a number of physical computing device nodes on which a number of virtual machine images is deployed. The number of physical computing device nodes is in the plurality of physical computing device nodes and the number of virtual machine images is in the set of virtual machine images. A quality of service requirement required for performing a particular workload is received. Using the model, a number of virtual software resource templates in the set of virtual software resource templates and a number of physical computing device nodes in the plurality of physical computing device nodes needed to fulfill the quality of service requirement required for performing the particular workload is determined. The number of virtual software resource templates on the number of physical computing device nodes needed to fulfill the quality of service requirement required for performing the particular workload is deployed using the associated metadata. The associated metadata includes a script that when executed installs and configures the number of virtual software resource templates on the number of physical computing device nodes needed to fulfill the quality of service requirement required for performing the particular workload.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A and 3B are a set of tables illustrating a software solution to be distributed that comprises components and supported topologies in accordance with an exemplary embodiment;

DETAILED DESCRIPTION OF THE PREFERRED EMBODIMENT

Figure 1:
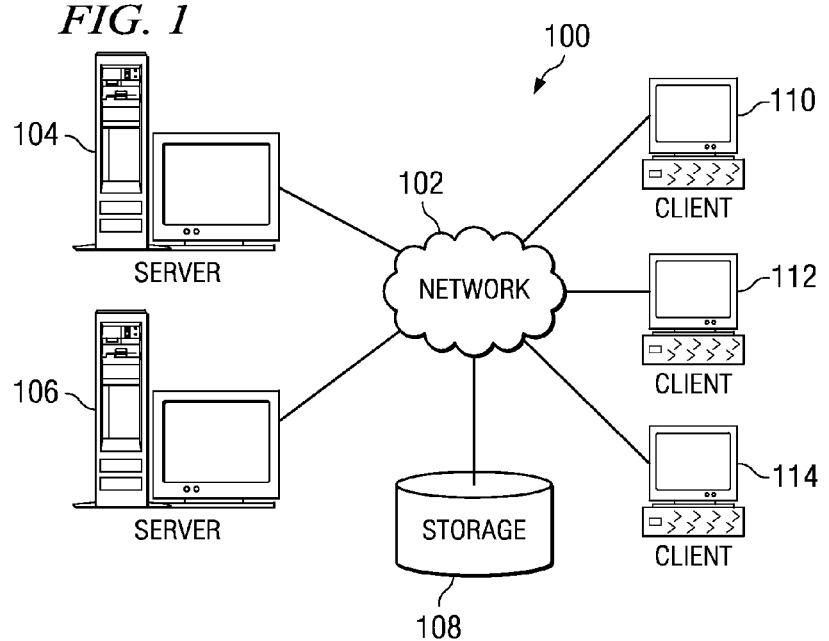
FIG. 1 is a pictorial representation of a network of data processing systems in which the exemplary embodiments may be implemented.
Figure 2:
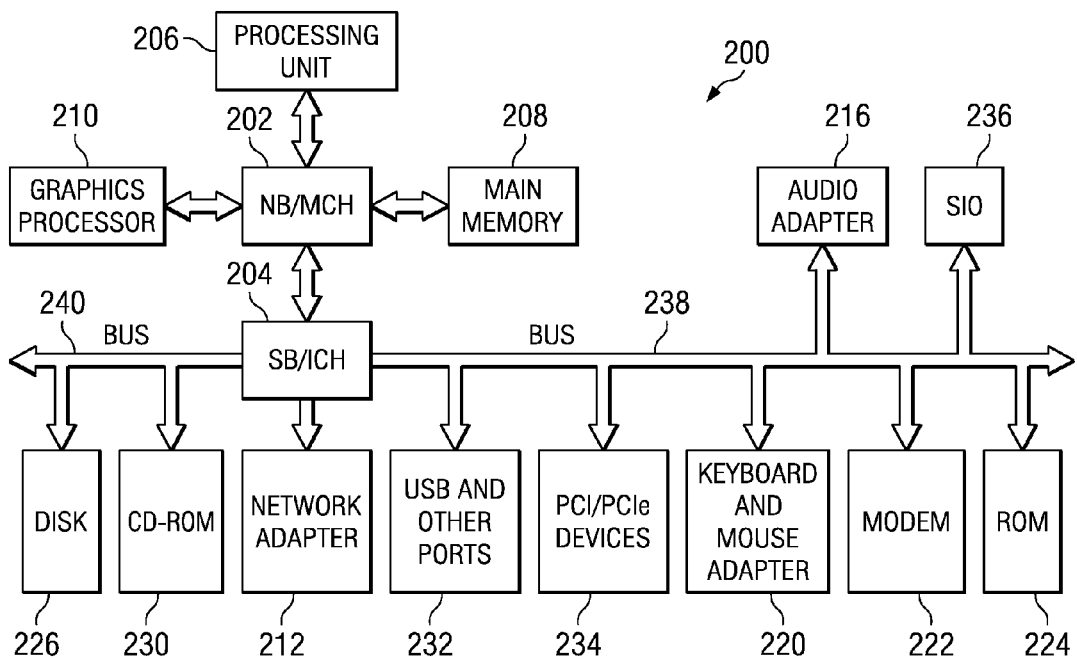
FIG. 2 is a block diagram of a data processing system in which the exemplary embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In one example, clients 110, 112, and 114 and servers 104 and 106 are nodes in a cluster. Clients 110, 112, and 114 and servers 104 and 106 may also be blades. In this example, clients 110, 112, and 114 and servers 104 and 106 may be configured with virtual machine images. For example, one or more virtual machine images may be instantiated on any of clients 110, 112, and 114 and servers 104 and 106. Virtual machine images are "instantiated" on clients 110, 112, and 114 and servers 104 and 106 when an instance of the virtual machine images exists on clients 110, 112, and 114 and servers 104 and 106. In another example, servers 104 and 106 may be able to deploy virtual software resource templates to clients 110, 112, and 114 over network 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In one example, one or more virtual machine images may be instantiated on data processing system 200.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer-implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments described herein provide a computer-implemented method, apparatus, and computer program product for deploying a set of virtual software resource templates to a plurality of nodes. A set of virtual software resource templates includes one or more virtual software resource templates. The process identifies a set of virtual machine images and metadata to form the set of virtual software resource templates. Thus, the set of virtual software resource templates is the set of virtual machine images and metadata.

The set of virtual machine images includes one or more virtual machine images. A virtual machine image is a file representation of a virtual machine, the virtual machine devices, and installed software components. For example, a virtual machine image may include a software stack. In this example, a virtual machine image may include an operating system, middleware, and application components. In this example, the virtual machine image may also be a collection of one or more "freeze-dried" or pre-configured software stacks.

Metadata is any data in the virtual software resource template that relates to the virtual software resource template. In one embodiment, the metadata indicates a function of the set of virtual software resource templates. In one non-limiting example, the metadata may indicate that a virtual software resource template stores and retrieves data in files.

In another embodiment, the metadata indicates whether a particular virtual machine image in the set of virtual machine images is capable of being instantiated on at least two nodes in the plurality of nodes. In another embodiment, the metadata indicates whether the set of virtual software resource templates is capable of being instantiated into the plurality of nodes in the set of nodes.

The process creates a model that indicates a performance metric based on a number of nodes on which a number of virtual machine images is deployed. A performance metric is a measure of the performance level for a particular number of virtual machine images that are instantiated on the set of nodes. For example, the performance metric may be a measurement of throughput, latency, or node availability. The number of nodes is in the plurality of nodes and the number of virtual machine images is in the set of virtual machine images. In one example, the model is a table that relates the performance metric to the number of instantiations of each virtual machine image or virtual software resource template. In another example, the metadata includes the model.

The process receives a quality of service requirement. A quality of service requirement is a performance measure that is required to perform a particular workload. For example, the quality of service requirement may be measured in throughput, latency, or node availability.

The process determines, using the model, a sufficient number of virtual software resource templates in the set of virtual software resource templates and a sufficient number of nodes in the plurality of nodes to fulfill the quality of service requirement. In one embodiment, determining, using the model, a sufficient number of virtual software resource templates in the set of virtual software resource templates and a sufficient number of nodes in the plurality of nodes to fulfill the quality of service requirement includes determining a sufficient number of virtual software resource templates in the set of virtual software resource templates and a sufficient number of nodes in the plurality of nodes to fulfill the quality of service requirement based on dependencies for the set of virtual machine images.

A dependency may be an intra-virtual software resource template dependencies or an external dependency. Intra-virtual software resource template dependencies are the dependencies between the virtual machine images. External dependencies are the dependencies between a virtual machine image and components that are external to the virtual software resource templates in which the virtual machine image is contained.

The process deploys the sufficient number of virtual software resource templates on the sufficient number of nodes using the metadata. In one embodiment, the metadata includes a script, and deploying the sufficient number of virtual software resource templates includes executing a script that installs and configures the sufficient number of virtual software resource templates on the sufficient number of nodes. In another embodiment, deploying the sufficient number of virtual software resource templates includes instantiating a sufficient number of virtual machine images on the sufficient number of nodes. "Deploying" the sufficient number of virtual software resource templates on the sufficient number of nodes includes installing, transferring, or moving the sufficient number of virtual software resource templates on the sufficient number of nodes. "Deploying" the sufficient number of virtual software resource templates on the sufficient number of nodes also includes configuring the sufficient number of nodes to contain the sufficient number of virtual software resource templates.

Another illustrative embodiment provides for managing software by deploying, configuring, and instantiating a software solution distributed as a set of virtual machine images. Depending on the topology, some components of a virtual machine image communicate with other components in the same virtual machine image, while other components communicate with components in other virtual machine images.

Returning to the figures, FIGS. 3A and 3B are a set of tables illustrating a software solution to be distributed that comprises components and supported topologies in accordance with an exemplary embodiment. Table 302 shows the components of a software solution. Column 305 contains entries for each of the major components. The Column 307 contains entries for the required middleware components for the corresponding major component and regular component.

Table 320 shows the various topologies supported by the solution of table 302. Column 323 contains entries for each of the supported topologies. Column 325 contains entries for the names of the topology nodes or virtual machine images that comprise the supported topology entry in column 323. Column 327 contains entries for major components from table 302 that comprise the topology nodes in the entry of column 325. Following the name of each major component in the entry of column 327 is the name of the specific topology node in the entry of column 325 to which the major component belongs.

Figure 4:
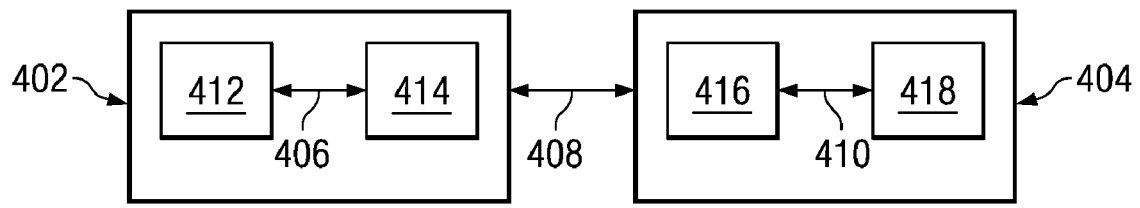
FIG. 4 is a block diagram illustrating deployed virtual machine images in accordance with an exemplary embodiment.

FIG. 4 is a block diagram illustrating deployed virtual machine images in accordance with an exemplary embodiment. The virtual machine images in FIG. 4 may be deployed by a data processing system, such as data processing system 200 in FIG. 2. FIG. 4 shows two virtual machine images 402 and 404. Virtual machine image 402 comprises components 412 and 414. Virtual machine image 404 comprises components 416 and 418. The connections between components 412-414 and 416-418, connections 406 and 410, respectively, remains inside the boundary of the respective virtual machine images while the connection between components 414 and 418, connection 408, traverses the boundary of the virtual machine images.

The connection between components 412 and 414 can be established and configured at the time of the creation of virtual machine image 402 while the connection between components 416 and 418 needs to be established and configured at the time of deployment. FIG. 4 illustrates a reason why deploying software solutions as virtual machine images are so appealing. That is, the customers need to handle only a fraction of the total dependencies between the solution components, namely, the dependencies that cross the boundaries of the virtual machines.

In an exemplary embodiment, the virtual machine image is treated as a single software component with well-identified access points. From this perspective, the specific components in a virtual machine image, such as a Linux® operating system, a queue manager, and a database that is only used by the queue manager, is irrelevant. What is relevant is the designed role or capability of the virtual machine image, such as a provider of a queue manager service and the access point(s) of the virtual machine image. Some examples of access points are protocol, address, port, and any other parameter needed to connect to the virtual machine image.

An exemplary embodiment provides for using metadata that describes hardware and software requirements of each virtual machine image, the services the virtual machine image exposes with associated access points, the services that the virtual machine image requires from other components in order to fulfill the role of the virtual machine image in the overall system, and other related metadata. Since the metadata describes hardware and software requirements of each virtual machine image, the metadata may be considered personalized metadata.

An exemplary embodiment provides for a virtual software resource template (VSRT). A virtual software resource template is the set of virtual machine images and metadata. In one example, a virtual software resource template is a collection of one or more freeze-dried software stack(s) with associated metadata. A freeze-dried software stack is a software stack comprised of pre-configured, pre-tuned, and hardened components, such as an operating system, an application server, a database, and a set of applications. A pre-tuned or hardened component is a component whose configuration, all the parameters that influence the behavior of the component at run time, has been already executed and the results stored in the virtual machine image.

Examples of metadata information include, but are not limited to, information such as location of freeze-dried software stack volumes, hardware requirements such as CPU, memory, disk, network, and so forth, for hosting the virtual software resource template, external and internal virtual machine image dependencies, policies associated with capacity, configuration parameters for the solution, and so forth.

Virtual software resource templates may be either simple or composite. A simple virtual software resource template, also called a base virtual software resource template, comprises a single software stack. That is, a base virtual software resource template comprises a virtual machine image and metadata for a single virtual machine. A composite virtual software resource template comprises multiple, finer grained software stacks. That is, a composite virtual software resource template comprises multiple virtual machine images and metadata for multiple virtual machines.

Composite virtual software resource templates contain information about assembling a set of virtual software resource templates into a single distributed application or "solution". Virtual software resource templates may be deployed on a set of physical machines either by running in a virtual container or directly on physical machines like a blade. A virtual container is a program capable of instantiating and running virtual software resource templates, such as VMware® Server. When virtual software resource templates are instantiated on a set of physical machines, one or more virtual software resources (VSRs) are created. A virtual software resource is a resource that is deployed, configured, and running.

An exemplary embodiment provides for a base virtual software resource template comprised of the following metadata information: an identifier, a name, a description, disk image information, hardware profile, software profile, capabilities, configuration, scale-out/clustering, intra-virtual software resource template dependencies, and external dependencies.

An identifier is a globally unique identifier that may act as a primary key for machine identification of the software stack contained in the virtual machine image. A name is a unique name for human identification of the software stack. The description is a short description of the functionality provided by the software stack. Disk image information includes, for example, the location of the disk images. A hardware profile is the virtual machine image hardware requirements. These include, for example, CPU, memory, disk, network, and so forth. This information is used for resource matching during the deployment phase and results in the virtual machine definition.

A software profile includes detailed information about the software installed on the disk images. A disk image is the file image of a virtual disk. A virtual machine can have different virtual disks much like a physical machine can have different hard disks, for example, the operating system version and release information. This information is particularly useful when the virtual software resource template is being extended vertically by the application or when the virtual software resource template is being upgraded, for example, by applying fix-packs to the middleware and/or operating system.

Fix-packs are fixes that software vendors provide for the bugs found in their software that need to be applied by customers on top of their existing software installation for the software to work properly. Capabilities are metadata that express or explain the capabilities provided by the software stack, for example, a J2EE™ application server or a servlet container and so forth. Configuration information is metadata that defines data that is needed for the solution to be customized and configured. The configuration data is provided during the deployment of the virtual software resource template.

Scale-out/clustering information is metadata that identifies the policies associated with scale-out of virtual software resource templates. A computer "cluster" is a group of loosely coupled computers that work together closely so that in many respects they can be viewed as though they are a single computer. Clusters are usually deployed to improve speed and/or reliability over that provided by a single computer, while typically being much more cost-effective than single computers of comparable speed or reliability.

This technique of grouping computers is called "clustering". "Scale-out" in the exemplary embodiments is used to define machines, physical or virtual, that are clustered together to increase throughput and improve speed. The scale-out information is useful at run time for optimal instantiation and placement of virtual machines. The intra-virtual software resource template dependencies are the dependencies between the various software stacks included in the composite virtual software resource template.

For example, IT Service Management (ITSM) Command Line Interface (CLI) client software stack "uses" IT Service Management data server software stack. External dependencies are the dependencies between a virtual machine images and external components. For example, a WebSphere application server software stack might use a Lightweight Directory Access Protocol (LDAP) server for authentication.

An exemplary embodiment provides for a composite virtual software resource template comprised of the following metadata information: an identifier, a name, a version, a description, capabilities, capacity, cost of instantiation, and constituent virtual software resource templates. An identifier is a globally unique identifier that could act as a primary key for machine identification of the virtual software resource template. A name is a unique name for the human identification of a virtual software resource template.

A version refers to the version of the virtual software resource template. The description is a short description of the functionality provided by the virtual software resource template. The description may function as a miniature README file for the solution. Capabilities are metadata that express or explain the capabilities provided by the virtual software resource template, for example, a J2EE™ application server, a servlet container, and so forth.

The capacity identifies the capacity of the virtual software resource template, provided that the hardware and software requirements are met. An example of capacity is the number of clients that the virtual software resource template is capable of serving. The cost of instantiation is metadata that identifies the cost associated with the instantiation of the virtual software resource template into a virtual software resource (VSR). Cost refers to the time taken to perform the function. The cost information can be used, for example, by a utility function to decide whether creating a new instance of a virtual software resource template in response to an increased workload of short duration would be worthwhile.

The constituent virtual software resource template's metadata comprises information about the virtual software resource template that makes up the distributed application, such as an IT Service Management data server or IT Service Management User Interface server. The constituent virtual software resource template's metadata takes the form of one or more entries. Each entry comprises an identifier and a role. The identifier is the identifier of the base virtual software resource template. The role describes the role the software stack in the base virtual software resource template will play in the solution described by the composite virtual software resource template.

For example, a WebSphere® application server software stack may play a role of a deployment manager or an application server or both. It should be noted that the constituent virtual software resource templates referred to in a composite virtual software resource template may themselves be either base or composite virtual software resource templates. Thus, composite virtual software resource templates may be nested.

Figure 5:
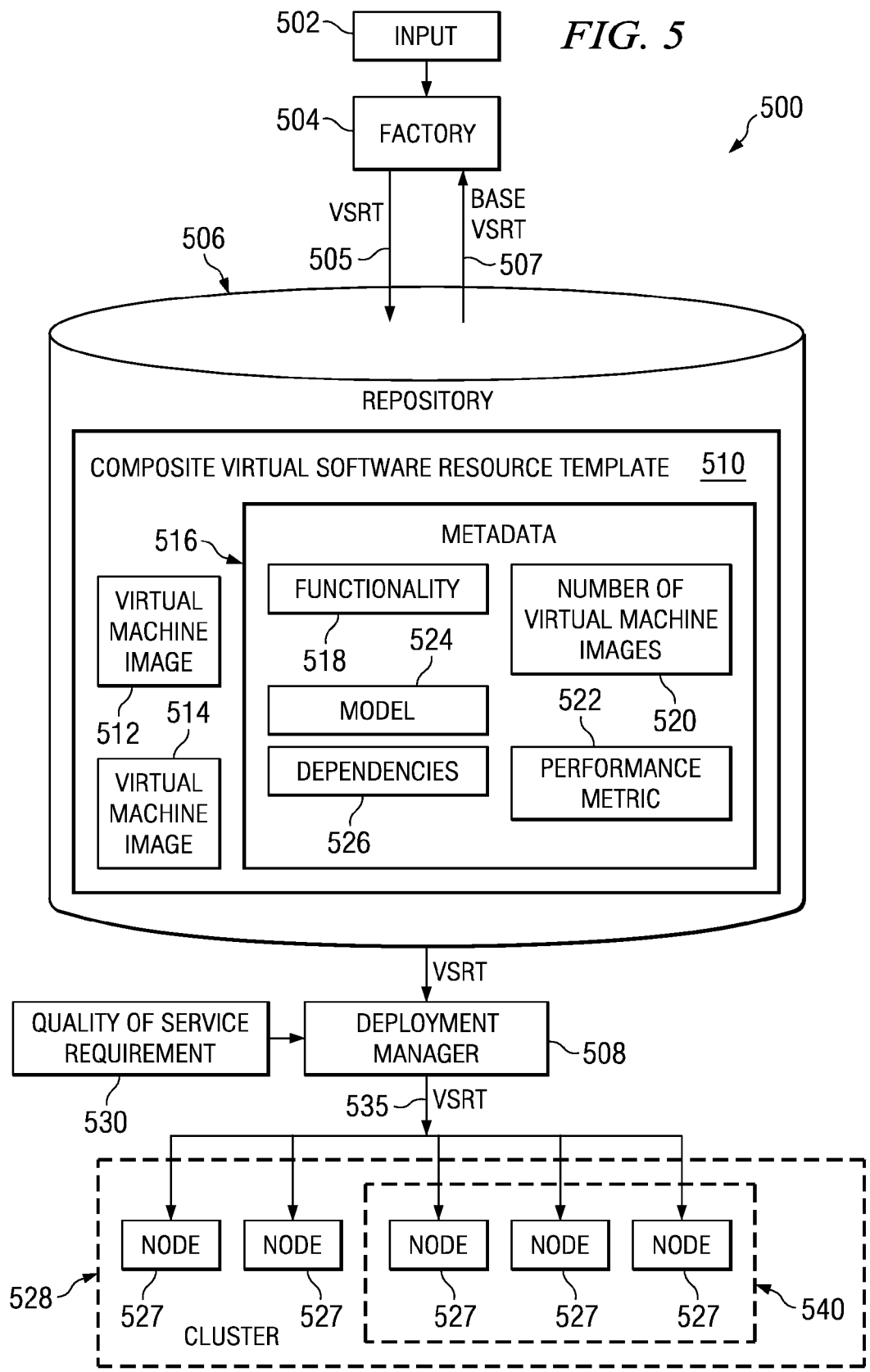
FIG. 5 is a block diagram of a system for deploying a set of virtual software resource templates to a plurality of nodes in accordance with an illustrative embodiment.

Turning now to FIG. 5, a block diagram of data processing system 500 for deploying a set of virtual software resource templates to a plurality of nodes is depicted in accordance with an illustrative embodiment. The components in FIG. 5 may be implemented on one or more data processing systems, such as data processing system 200 in FIG. 2. Factory 504 is responsible for the production of virtual software resource templates, both base and composite virtual software resource templates, including the virtual machine images and associated metadata. Factory 504 receives input 502 from which a virtual software resource template is built. Factory 504 stores virtual software resource template 505 in repository 506.

Input 502 comprises various inputs including the logical application structure from the application developer or a logical topology. For example, input 502 may indicate a three-tier deployment of a typical web application versus two-tier deployment from a user who could be a domain expert, DB2 and other middleware base. Factory 504 also receives base virtual software resource templates, such as base virtual software resource template 507, which are used as building blocks for other composite virtual software resource templates. The inputs to factory 504 contain enough information to produce the virtual software resource template metadata required for a particular implementation.

In another embodiment, factory 504 identifies a set of virtual machine images and metadata to generate a set of virtual software resource templates. Factory 504 generates a set of virtual software resource templates using two methods. In the first method, the set of virtual software resource templates are generated from a deployed application in a test environment. The deployed application may be on any fixed number of nodes, such as nodes 527. Using the deployed applications, factory 504 may distill a set of virtual machine images and metadata. Each type of node in the set of deployed applications is used to distill a virtual machine image. Non-limiting examples of virtual machine images that may be distilled using the deployed applications include a request dispatcher image, a web server image, an application server image, a central deployment server image, and a DB2 image. The virtual machine images may be images on either physical machines or virtual machines.

The virtual machine image may include an entire installed software stack in a node from the lowest functional level to the highest functional level. In the example in which the virtual machine image is an application server image, the application server images may include a Linux operating system, Java™ virtual machines, a Websphere application server, and a J2EE application installed on the application server.

In this example, factory 504 also distills the virtual machine image after the image is captured such that multiple copies of the image may be deployed. Distilling includes parameterizing configuration data in the virtual machine image, and parameterizing configuration data in the virtual machine images on which the virtual machine image depends.

Configuration data may be "parameterized" by indicating the configuration data in terms of parameters that can have different values. For example, the configuration data may have a parameter corresponding to an internet protocol address, which can be assigned different values depending on the machine on which the virtual machine image is deployed. Thus, in a distilling example in which a centralized deployment server image keeps information regarding a number of application server images and maintains pointers to the application server images, the configuration information in the central deployment server image is parameterized to enable deployment of multiple copies of the application server images. In another embodiment, "parameterizing" means to generalize all or a portion of configuration data into one or more variables that may be assigned to different values for each deployment. For example, WebSphere application server configuration data includes a host name, which may have a value such as "machine1.watson.ibm.com."

After a virtual machine image is captured, the configuration data may be parameterized into the variable "$hostname." Configuration scripts may then replace the $hostname variable with different host names that correspond to different deployments, such as "machine3.watson.ibm.com." In a second method of generating a set of virtual software resource templates, factory 504 generates the set of virtual machine images in the set of virtual software resource templates using an installation program of the deployment applications.

An example of a composite virtual software resource template is shown in repository 506. Although repository 506 is shown to contain a single composite virtual software resource template 510, repository 506 may contain any number of composite virtual software resource templates. For example, multiple composite virtual software resource templates may exist in repository 506 for a particular application distributed on cluster 528. These multiple composite virtual software resource templates accommodate different system architectures that may be necessary to fulfill different service requirements. Also, the multiple composite virtual software resource templates may be stored in a library indexed by each composite virtual software resource template's functionality and the range of performance that each composite virtual software resource template can provide. A user may find a particular composite virtual software resource template using the library.

Composite virtual software resource template 510 includes virtual machine images 512 and 514. Although FIG. 5 shows two virtual machine images 512 and 514 in repository 506, any number of virtual machine images may reside in repository 506.

Composite virtual software resource template 510 also includes metadata 516. Metadata 516 describes the functionality, configuration, and other attributes of composite virtual software resource template 510, including virtual machine images 512 and 514. In another embodiment, metadata 516 indicates whether a particular virtual machine image in virtual machine images 512 and 514 is capable of being instantiated on at least two nodes in cluster 528. In another embodiment, metadata 516 indicates whether composite virtual software resource template 510 is capable of being instantiated into at least two nodes in cluster 528.

Metadata 516 includes functionality 518. Functionality 518 is a description of the function of composite virtual software resource template 510. The description may be applied to a set of virtual machine images in cluster 528. In one non-limiting example, functionality 518 may indicate that a virtual software resource template stores and retrieves data in files.

Composite virtual software resource template 510 also includes number of virtual machine images 520. Number of virtual machine images 520 is an indication of the number of virtual machine images, such as virtual machine images 512 and 514, in cluster 528. For example, some virtual machine images in composite virtual software resource template 510 may be instantiated in multiples nodes of cluster 528, while other virtual machine images are instantiated in only one node of cluster 528. Number of virtual machine images 520 provides such information.

In one example, number of virtual machine images 520 may indicate that a three-tiered J2EE system may have a WebSphere deployment manager image, an application server image, and a DB2 image. In this example, the application server image may be instantiated onto several nodes 527 that are managed by one deployment manager image.

Metadata 516 includes performance metric 522. Performance metric 522 is a measure of the performance level for a particular number of virtual machine images in composite virtual software resource template 510 that are instantiated on nodes 527. Thus, performance metric 522 may contain any number of performance metrics that relate to different numbers of virtual machine images and nodes.

For example, the performance metric may be a measurement of throughput, latency, or node availability. Throughput may be measured as a number of requests per second. Latency may be measured as the bound on the worst-case latency, mean latency, average latency, or latency of a certain percentage of requests. Availability may be measured as the percentage of downtime for a system, such as cluster 528. One factor that may affect availability is whether virtual machine images are located on a single node in cluster 528.

Metadata includes model 524. In one embodiment, factory 504 creates model 524. Model 524 may indicate a performance metric, such as performance metric 522, based on the number of nodes in cluster 528 on which a particular number of virtual machine images, such as virtual machine images 512 and 514, are deployed. For example, model 524 may relate performance metric 522 to the number of instantiations of each virtual machine image, such as virtual machine images 512 and 514, and the computation power and availability of each node 527 in which each virtual machine image is instantiated. In one example, the model is a function, as follows:

$$P(N1, H1, N2, H2, \ldots, N_n, H_n)$$

In this function, N1 is the number of instantiations of virtual machine image 512. H1 is a description of the node in cluster 528 to which virtual machine image 512 is instantiated. H1 may use low-level or high-level metrics.

In the case in which H1 uses low-level metrics, H1 may describe attributes such as processor speed, disk capacity and latency, memory latency, and mean time to hardware failure. In the case in which H1 uses high-level metrics, H1 may indicate benchmarks for each node in cluster 528, such as Transactional Processing Performing Council (TPC) or "Spec" benchmarks. TPC is a set of benchmarks measuring transaction performance. The Spec organization benchmark provides a benchmark for various computer systems. These benchmarks indicate whether a computer system can provide a certain level of performance required by users. In another example, system performance may be measured by capturing a set of traces and replaying the trace for measurement purposes.

The function used for model 524 may be represented by a table. By inverting the function, such as the P(N1, H1, N2, H2, . . . , $N_n$, $H_n$) function described above, the amount and type of nodes 527 needed to support a level of performance can be found. In one example, a function P(x) is used to compute a quality of service, such as system performance, throughput, and availability, using a system configuration such as a number of instances for each virtual software resource template. P(x) may be inverted to g(P(x)) such that a system configuration may be computed from one or more quality of service requirements.

Metadata 516 also includes dependencies 526. Dependencies 526 indicates intra-virtual software resource template dependencies and external dependencies of virtual machine images 512 and 514. Intra-virtual software resource template dependencies are the dependencies between the virtual machine images. External dependencies are the dependencies between a virtual machine image and components that are external to the virtual software resource templates in which the virtual machine image is contained.

Dependencies 526 may be expressed declaratively or procedurally. In a declarative expression, the dependency on a number of virtual machine image instantiations may be captured by a variable in an extensive markup language file. This number may correspond to the real number of virtual machine image instantiations in cluster 528. A procedural description may be an executable script that resolves dependencies among virtual machine images 512 and 514.

The process receives quality of service requirement 530. Quality of service requirement 530 is a performance requirement to perform a workload. For example, quality of service requirement 530 may be measured in throughput, latency, or node availability. Quality of service requirement 530 may be sent by a user. In one example, a user formulates a quality of service requirement based on a projection of the potential workload, system capacity planning, or system profiles to measure the load.

Deployment manager 508 determines, using model 524, sufficient number of virtual software resource templates 535 in the set of virtual software resource templates in repository 506 and a sufficient number of nodes 540 in cluster 528 to fulfill quality of service requirement 530. In one embodiment, deployment manager 508 also determines sufficient number of virtual software resource templates 535 in the set of virtual software resource templates in repository 506 and a sufficient number of nodes 540 in cluster 528 to fulfill quality of service requirement 530 based on dependencies 526. In this embodiment, dependencies 526 is used to ensure the compatibility of virtual machine images on nodes 527.

In one example, deployment manager 508 calculates the number of nodes in cluster 528 and the number of virtual machine images needed for a particular quality of service requirement that is required by a distributed application. In another example, model 524 is a table that relates performance metric 522 to the number of instantiations of each virtual machine image 512 and 514 or virtual software resource template. In this example, a determination of the sufficient number of virtual software resource templates and nodes 527 in cluster 528 to fulfill quality of service requirement 530 may use a table look-up operation.

Several configurations of virtual software resource templates and nodes 527 may be looked up in the table for a particular set of quality of service requirements. The different configurations also take into account the power of the particular nodes that are used. A user may then select among the set of look-up configurations based on cost and other factors, such as whether the required hardware is currently available.

The process deploys sufficient number of virtual software resource templates 535 on sufficient number of nodes 540 using the metadata. In one embodiment, metadata 516 includes a script, and deploying sufficient number of virtual software resource templates 535 includes executing a script that installs and configures the set of virtual machine images on sufficient number of nodes 540. The parameters of the script may include a set of host platforms, as well as other resources such as internet protocol addresses for each virtual machine image.

These parameters may be provided by a central inventory such as TPM Data Center Model. TPM is a product of International Business Machines Corporation, located in Armonk, N.Y. In another embodiment, deploying sufficient number of virtual software resource templates 535 includes instantiated a sufficient number of virtual machine images, such as virtual machine images 512 and 514, on sufficient number of nodes 540.

In one non-limiting example for illustrating the operation of data processing system 500, quality of service requirement 530 includes a throughput requirement of ten transactions per second and a latency requirement of less than two seconds. In response to this exemplary quality of service requirement, deployment manager 508 may then instantiate a virtual software resource template that includes a WebSphere image and a DB2 image into one WebSphere application service machine and one DB2 machine on a node in cluster 528 having a one gigahertz uniprocessor. In another embodiment, deployment manager 508 may allocate virtual quantities to a virtual machine image to fulfill quality of service requirement 530. For example, deployment manager 508 may allocate 50 percent of the processor capacity and 30 percent of the memory capacity of a three-gigahertz, sixteen-gigabyte random access memory IBM xseries machine to a virtual machine image hosted by the xseries machine.

In another non-limiting example for illustrating the operation of data processing system 500, quality of service requirement 530 includes a throughput requirement of 30 transactions per second and a latency requirement of less than two seconds. In response to this exemplary quality of service requirement, deployment manager 508 may then instantiate a virtual software resource template that includes a WebSphere image and a DB2 image into three WebSphere application service machines and one DB2 machine on a node in cluster 528 having four two-gigahertz processors.

Another illustrative embodiment provides for managing software by deploying, configuring, and instantiating a software solution distributed as virtual machine images. A virtual machine image consists of an operating system, middleware, and application components. Depending on the topology, some of these components communicate with other components in the same virtual machine image, while other components communicate with components in other images.

Figure 6:
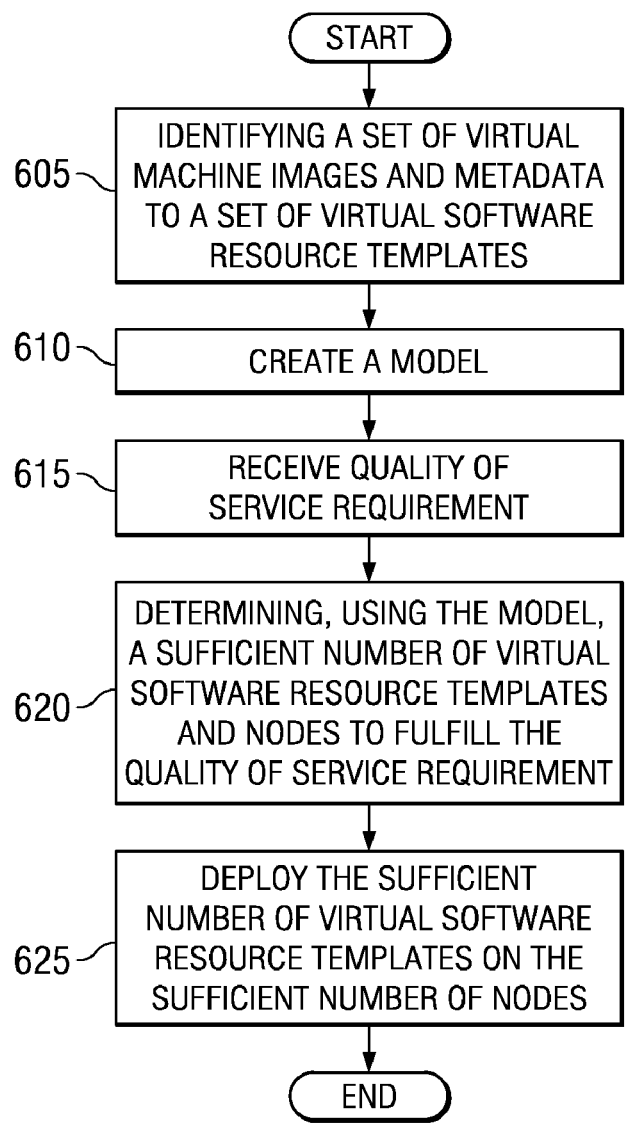
FIG. 6 is a flowchart of a system for deploying a set of virtual software resource templates to a plurality of nodes in accordance with an illustrative embodiment.

Turning now to FIG. 6, a flowchart of a system for deploying a set of virtual software resource templates to a plurality of nodes is depicted in accordance with an illustrative embodiment. The process illustrated in FIG. 6 may be implemented by a data processing system, such as data processing system 500 in FIG. 5.

The process begins by identifying a set of virtual machine images and metadata to form the set of virtual software resource templates (step 605). The process creates a model (step 610). The model indicates a performance metric based on a number of nodes on which a number of virtual machine images is deployed.

The process receives a quality of service requirement (step 615). The process determines, using the model, a sufficient number of virtual software resource templates in the set of virtual software resource templates and a sufficient number of nodes in the plurality of nodes to fulfill the quality of service requirement (step 620).

The process deploys the sufficient number of virtual software resource templates on the sufficient number of nodes using the metadata (step 625). The process then terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer-implemented method, apparatus, and computer program product for deploying a set of virtual software resource templates to a plurality of nodes. The process identifies a set of virtual machine images and metadata to form the set of virtual software resource templates. Thus, the set of virtual software resource templates is the set of virtual machine images and metadata.

In one embodiment, the metadata indicates whether a particular virtual machine image in the set of virtual machine images is capable of being instantiated on at least two nodes in the plurality of nodes. In another embodiment, the metadata indicates whether the set of virtual software resource templates is capable of being instantiated into the plurality of nodes in the set of nodes.

The process creates a model that indicates a performance metric based on a number of nodes on which a number of virtual machine images is deployed. The number of nodes is in the plurality of nodes and the number of virtual machine images is in the set of virtual machine images. In one example, the model is a table that relates the performance metric to the number of instantiations of each virtual machine image or virtual software resource template. In another example, the metadata includes the model.

The process receives a quality of service requirement. A quality of service requirement is a performance measure that is required to perform a particular workload. For example, the quality of service requirement may be measured in throughput, latency, or node availability.

The process determines, using the model, a sufficient number of virtual software resource templates in the set of virtual software resource templates and a sufficient number of nodes in the plurality of nodes to fulfill the quality of service requirement. In one embodiment, determining, using the model, a sufficient number of virtual software resource templates in the set of virtual software resource templates and a sufficient number of nodes in the plurality of nodes to fulfill the quality of service requirement includes determining a sufficient number of virtual software resource templates in the set of virtual software resource templates and a sufficient number of nodes in the plurality of nodes to fulfill the quality of service requirement based on dependencies for the set of virtual machine.

The process deploys the sufficient number of virtual software resource templates on the sufficient number of nodes using the metadata. In one embodiment, the metadata includes a script, and deploying the sufficient number of virtual software resource templates includes executing a script that installs and configures the sufficient number of virtual software resource templates on the sufficient number of nodes. In another embodiment, deploying the sufficient number of virtual software resource templates includes instantiated a sufficient number of virtual machine images on the sufficient number of nodes. "Deploying" the sufficient number of virtual software resource templates on the sufficient number of nodes includes installing, transferring, or moving the sufficient number of virtual software resource templates on the sufficient number of nodes. "Deploying" the sufficient number of virtual software resource templates on the sufficient number of nodes also includes configuring the sufficient number of nodes to contain the sufficient number of virtual software resource templates.

Another illustrative embodiment provides for managing software by deploying, configuring, and instantiating a software solution distributed as a set of virtual machine images. Depending on the topology, some components of a virtual machine image communicate with other components in the same virtual machine image, while other components communicate with components in other virtual machine images.

The illustrative embodiments automate the process of deploying distributed systems having differing amounts of hardware and software needed to meet a certain workload. Workloads may be characterized in various ways, and may require a particular quality of service. Based on the quality of service requirement for a particular workload, in one example, the illustrative embodiments automatically calculate the number of needed machines, the type of software needed for each machine, and the interdependency among the machines. The illustrative embodiments may then automatically generate scripts to provision the hardware to install the required software on each machine and configure the interdependency among the machines to meet the quality of service requirement.

Thus, the exemplary embodiments provide for a simplified method of managing software. The software solution is managed by deploying, configuring, and instantiating the software solution distributed as virtual machine images.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for deploying a set of virtual software resource templates to a plurality of physical computing device nodes, the computer-implemented method comprising the steps of:
    identifying, by a data processing system, a set of virtual machine images and associated metadata of each virtual machine image in the set of virtual machine images;
    generating, by the data processing system, the set of virtual software resource templates using the set of virtual machine images and associated metadata;
    storing, by the data processing system, the set of virtual software resource templates in a repository;
    creating, by the data processing system, a model that includes a performance level metric based on a number of physical computing device nodes on which a number of virtual machine images is deployed, wherein the number of physical computing device nodes is in the plurality of physical computing device nodes and the number of virtual machine images is in the set of virtual machine images;
    receiving, by the data processing system, a quality of service requirement required for performing a particular workload;
    determining, by the data processing system using the model, a number of virtual software resource templates in the set of virtual software resource templates and a number of physical computing device nodes in the plurality of physical computing device nodes needed to fulfill the quality of service requirement required for performing the particular workload; and
    deploying, by the data processing system, the number of virtual software resource templates on the number of physical computing device nodes needed to fulfill the quality of service requirement required for performing the particular workload using the associated metadata, wherein the associated metadata includes a script that when executed installs and configures the number of virtual software resource templates on the number of physical computing device nodes needed to fulfill the quality of service requirement required for performing the particular workload.

2. The computer-implemented method of claim 1, wherein the associated metadata indicates whether a particular virtual machine image in the set of virtual machine images is capable of being instantiated on at least two nodes in the plurality of physical computing device nodes needed to fulfill the quality of service requirement required for performing the particular workload.

3. The computer-implemented method of claim 1, wherein the associated metadata indicates a function of the set of virtual software resource templates.

4. The computer-implemented method of claim 1, wherein determining, by the data processing system using the model, the number of virtual software resource templates in the set of virtual software resource templates and the number of physical computing device nodes in the plurality of physical computing device nodes needed to fulfill the quality of service requirement required for performing the particular workload further comprises:
    determining, by the data processing system, the number of virtual software resource templates in the set of virtual software resource templates and the number of physical computing device nodes in the plurality of physical computing device nodes needed to fulfill the quality of service requirement required for performing the particular workload based on intra-virtual software resource template connection dependencies and external virtual software resource template connection dependencies for the set of virtual machine images.

5. The computer-implemented method of claim 1, wherein the associated metadata indicates whether the set of virtual software resource templates is capable of being instantiated into the plurality of physical computing device nodes needed to fulfill the quality of service requirement required for performing the particular workload.

6. The computer-implemented method of claim 1, wherein the set of virtual software resource templates comprise a composite virtual software resource templates that includes a plurality of virtual machine images, and wherein the associated metadata comprises metadata associated with each of the plurality of virtual machine images.

7. The computer-implemented method of claim 1, wherein the associated metadata comprises the model.

8. A computer program product stored on a computer-readable storage medium having computer-usable program code embodied thereon that is executable by a computer for deploying a set of virtual software resource templates to a plurality of physical computing device nodes, the computer program product comprising:
    computer-usable program code for identifying a set of virtual machine images and associated metadata of each virtual machine image in the set of virtual machine images;
    computer-usable program code for generating the set of virtual software resource templates using the set of virtual machine images and associated metadata;
    computer-usable program code for storing the set of virtual software resource templates in a repository;
    computer-usable program code for creating a model that includes a performance level metric based on a number of physical computing device nodes on which a number of virtual machine images is deployed, wherein the number of physical computing device nodes is in the plurality of physical computing device nodes and the number of virtual machine images is in the set of virtual machine images;

computer-usable program code for receiving a quality of service requirement required for performing a particular workload;

computer-usable program code for determining, using the model, a number of virtual software resource templates in the set of virtual software resource templates and a number of physical computing device nodes in the plurality of physical computing device nodes needed to fulfill the quality of service requirement required for performing the particular workload; and computer-usable program code for deploying the number of virtual software resource templates on the number of physical computing device nodes needed to fulfill the quality of service requirement required for performing the particular workload using the associated metadata, wherein the associated metadata includes a script that when executed installs and configures the number of virtual software resource templates on the number of physical computing device nodes needed to fulfill the quality of service requirement required for performing the particular workload.

9. The computer program product of claim 8, wherein the computer-usable program code for determining, using the model, the number of virtual software resource templates in the set of virtual software resource templates and the number of physical computing device nodes in the plurality of physical computing device nodes needed to fulfill the quality of service requirement required for performing the particular workload further comprises:

computer-usable program code for determining the number of virtual software resource templates in the set of virtual software resource templates and the number of physical computing device nodes in the plurality of physical computing device nodes needed to fulfill the quality of service requirement required for performing the particular workload based on intra-virtual software resource template connection dependencies and external virtual software resource template connection dependencies for the set of virtual machine images.

10. The computer program product of claim 8, wherein the associated metadata indicates whether the set of virtual software resource templates is capable of being instantiated into the plurality of physical computing device nodes needed to fulfill the quality of service requirement required for performing the particular workload.

11. The computer program product of claim 8, wherein the set of virtual software resource templates comprise a composite virtual software resource template that includes a plurality of virtual machine images, and wherein the associated metadata comprises metadata associated with each of the plurality of virtual machine images.

12. The computer program product of claim 8, wherein the associated metadata comprises the model.

13. A data processing system for deploying a set of virtual software resource templates to a plurality of physical computing device nodes, the data processing system comprising:

a bus system;

a memory connected to the bus system, wherein the memory stores a set of instructions; and a processing unit connected to the bus system, wherein the processing unit executes the set of instructions to identify a set of virtual machine images and associated metadata of each virtual machine image in the set of virtual machine images; generate the set of virtual software resource templates using the set of virtual machine images and associated metadata; store the set of virtual software resource templates in a repository; create a model that includes a performance level metric based on a number of physical computing device nodes on which a number of virtual machine images is deployed, wherein the number of physical computing device nodes is in the plurality of physical computing device nodes and the number of virtual machine images is in the set of virtual machine images; receive a quality of service requirement required for performing a particular workload; determine, using the model, a number of virtual software resource templates in the set of virtual software resource templates and a number of physical computing device nodes in the plurality of physical computing device nodes needed to fulfill the quality of service requirement required for performing the particular workload; and deploy the number of virtual software resource templates on the number of physical computing device nodes needed to fulfill the quality of service requirement required for performing the particular workload using the associated metadata, wherein the associated metadata includes a script that when executed installs and configures the number of virtual software resource templates on the number of physical computing device nodes needed to fulfill the quality of service requirement required for performing the particular workload.

14. The data processing system of claim 13, wherein in executing the set of instructions to determine, using the model, a number of virtual software resource templates in the set of virtual software resource templates and a number of physical computing device nodes in the plurality of physical computing device nodes needed to fulfill the quality of service requirement required for performing the particular workload, the processing unit further executes the set of instructions to:

determine the number of virtual software resource templates in the set of virtual software resource templates and the number of physical computing device nodes in the plurality of physical computing device nodes needed to fulfill the quality of service requirement required for performing the particular workload based on intra-virtual software resource template connection dependencies and external virtual software resource template connection dependencies for the set of virtual machine images.

15. The data processing system of claim 13, wherein the associated metadata indicates whether the set of virtual software resource templates is capable of being instantiated into the plurality of physical computing device nodes needed to fulfill the quality of service requirement required for performing the particular workload.

16. The data processing system of claim 13, wherein the set of virtual software resource templates comprise a composite virtual software resource templates that includes a plurality of virtual machine images, and wherein the associated metadata comprises metadata associated with each of the plurality of virtual machine images.

17. The data processing system of claim 13, wherein the associated metadata comprises the model.

* * * * *